(12) United States Patent
Hao et al.

(10) Patent No.: US 11,474,951 B2
(45) Date of Patent: Oct. 18, 2022

(54) MEMORY MANAGEMENT UNIT, ADDRESS TRANSLATION METHOD, AND PROCESSOR

(71) Applicant: Alibaba Group Holding Limited, Grand Cafyman (KY)

(72) Inventors: Ziyi Hao, Hangzhou (CN); Xiaoyan Xiang, Shanghai (CN); Feng Zhu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/023,024

(22) Filed: Sep. 16, 2020

(65) Prior Publication Data
US 2021/0089468 A1  Mar. 25, 2021

(30) Foreign Application Priority Data
Sep. 24, 2019  (CN) .......................... 201910906896.2

(51) Int. Cl.
| | |
|---|---|
| *G06F 12/10* | (2016.01) |
| *G06F 12/1027* | (2016.01) |
| *G06F 12/1009* | (2016.01) |
| *G06F 9/30* | (2018.01) |
| *G06F 12/0895* | (2016.01) |
| *G06F 12/0811* | (2016.01) |
| *G06F 12/0882* | (2016.01) |

(52) U.S. Cl.
CPC ...... *G06F 12/1027* (2013.01); *G06F 9/30047* (2013.01); *G06F 12/0811* (2013.01); *G06F 12/0882* (2013.01); *G06F 12/0895* (2013.01); *G06F 12/1009* (2013.01)

(58) Field of Classification Search
CPC ............ G06F 12/0811; G06F 12/1009; G06F 12/1027; G06F 9/30047; G06F 12/0882; G06F 12/0895
USPC ....................................................... 711/154
See application file for complete search history.

(56) References Cited

U.S. PATENT DOCUMENTS

| | | | |
|---|---|---|---|
| 9,690,714 B1* | 6/2017 | Sites ................... | G06F 12/1009 |
| 2008/0320216 A1 | 12/2008 | Fertig et al. | |
| 2015/0301841 A1* | 10/2015 | Mackintosh ........ | G06F 12/1009 |
| | | | 717/136 |
| 2018/0062843 A1* | 3/2018 | Gopal .................. | H04L 9/3066 |
| 2018/0203806 A1* | 7/2018 | Moudgill ............ | G06F 12/1036 |
| 2019/0213140 A1* | 7/2019 | Cooray ............... | G06F 12/1009 |
| 2019/0227947 A1 | 7/2019 | Keppel et al. | |
| 2020/0133881 A1* | 4/2020 | Campbell ........... | G06F 12/0893 |

* cited by examiner

*Primary Examiner* — Hua J Song (57) ABSTRACT

The present invention discloses a memory management unit, an address translation method, and a processor. The memory management unit includes: a translation lookaside buffer adapted to store a plurality of translation entries, where each translation entry includes a size flag bit, a virtual address tag, and a physical address tag, the virtual address tag represents a virtual page, the physical address tag represents a physical page corresponding to the virtual pane, and the size flag bit represents a page size of the virtual page; and a translation processing unit adapted to look up a translation entry whose virtual address tag matches a to-be-translated virtual address in the plurality of translation entries based on the page size represented by the size flag bit of the translation entry, and translate the virtual address into a physical address based on the matching translation entry.

17 Claims, 8 Drawing Sheets

MEMORY MANAGEMENT UNIT, ADDRESS TRANSLATION METHOD, AND PROCESSOR

CROSS-REFERENCE TO RELATED APPLICATIONS

This application claims priority to Chinese Patent Application No. 201910906896.2 filed Sep. 24, 2019, which is incorporated herein in its entirety.

TECHNICAL FIELD

The present invention relates to the processor field, and in particular, to a memory management unit, an address translation method, and a processor.

BACKGROUND OF THE INVENTION

In a modern operating system and CPU hardware, a memory management unit (MMU) is usually provided to manage memory access. A page table is stored in a memory, and each page table entry stores a correspondence between a virtual address page and a physical address page. Generally, the MMU also has a translation lookaside buffer (TLB). The TLB is a page table cache (Cache) storing page table entries most likely to be accessed currently. Content of the is a duplicate of some page table entries. In the present invention, the TLB entry is also referred to as a translation entry. A page size is an address range size (also referred to as an address translation size or an entry size) for an address translation relationship represented by one TLB entry. An instruction (or data) range that can be accommodated by one TLB is equal to a quantity of TLB entries included in the TLB multiplied by the page size.

In modern high-performance processors, a single small page size (usually 4 KB) cannot satisfy an address translation requirement of the operating system. Therefore, larger page sizes (16 KB, 64 KB, and even up to several MBs or OBs) are defined in an address translation programming model of the processor. The operating system flexibly selects a page size based on an actual software requirement, to create an address translation relationship.

In hardware design, to support an address translation relationship of a plurality of page sizes, a multi-TLB design manner is usually used to support a plurality of address translation sizes, and each TLB supports only one address translation size. For an address translation request, all TLBs are accessed simultaneously, and a TLB hit status is determined based on an, address translation size supported by each TLB. Finally, a hit entry is selected from the TLB having the hit entry and an address translation result is returned. During TLB backfilling, a to-be-backfilled MB entry of a corresponding size is selected for backfilling based on an address translation size of a backfill entry. More hardware resources are used in such multi-TLB design, resulting in low entry utilization and high-power consumption for TLB access.

SUMMARY OF THE INVENTION

In view of the foregoing problems, the present invention provides a memory management unit, an address translation method, and a processor, so as to resolve or at least partially resolve the foregoing problems.

According to one aspect of the present invention, a memory management unit is provided, including:

a translation lookaside, buffer adapted to store a plurality of translation entries, where each translation entry includes a size flag bit, a virtual address, tag, and a physical address tag, the virtual address tag represents a virtual page, the physical address tag represents a physical page corresponding to the virtual page, and the size flag bit represents a page size of the virtual page; and a translation processing unit adapted to look up a translation entry whose virtual address tag matches a to-be-translated virtual address in the plurality of translation entries based on the page size represented by the size flag bit of the translation entry, and translate the virtual address into a physical address based on the matching translation entry.

Optionally, in the memory management unit according to the present invention, the translation lookaside buffer uses a fully associative structure, and the translation processing unit is further adapted to: traverse the plurality of translation entries; for a traversed translation entry, truncate a virtual address tag from the to-be-translated virtual address based on a page size represented by a size flag bit of the translation entry; and compare the truncated virtual address tag with a virtual address tag of the translation entry. If the two virtual address tags are equal, matching succeeds.

Optionally, in the memory management unit according to the present invention, the translation lookaside buffer uses a set associative structure, and the translation processing unit is further adapted to: traverse a preset page size set; for a traversed page size, truncate a virtual address tag and a virtual address index from the to-be-translated virtual address based on the page size; locate a to-be-matched translation entry set in the plurality of translation entries based on the truncated virtual address index; and when the traversed page size is equal to a page size represented by a size flag bit of a translation entry in the to-be-matched translation entry set compare the truncated virtual address tag with a virtual address tag of the translation entry in the to-be-matched translation entry set. If the two virtual address tags are equal, matching succeeds.

Optionally, the memory management unit according to the present invention further includes a size register. When the translation processing unit succeeds in matching, the page size used for successful matching is further saved into the size register. During next-time translation processing, the translation processing unit first acquires a stored page size from the size register and then traverses the page size set starting from the acquired page size.

Optionally, in the memory management unit according to the present invention, when a matching translation entry is found, the translation processing unit translates the virtual address into a physical address in the following manner: acquiring a physical address tag from the matching translation entry; truncating an offset address from the virtual address; and splicing the physical address tag and the offset address to generate a translated physical address.

Optionally, the memory management unit according to the present invention further includes: a backfilling unit adapted to, when the translation processing unit fails in matching, initiate a backfill request to a lower-level cache by using the virtual address, and when the lower-level cache returns backfill content, fill the back fill content into a to-be-backfilled entry of the translation lookaside buffer.

Optionally, in the memory management unit according to the present invention, the lower-level cache is a translation lookaside buffer or a memory page table.

According to another aspect of the present invention, an address translation method is provided and is applicable for being executed in a memory management unit. The memory management unit provides a translation lookaside buffer. The translation lookaside buffer is adapted to store a plurality of translation entries, and each translation entry includes a size flag hit, a virtual address tag, and a physical address tag. The virtual address tag represents a virtual page, the physical address tag represents a physical page corresponding to the virtual page, and die size flag hit represents a page size of the virtual page. The method includes:

receiving an address translation request and acquiring a virtual address requesting for translation;

looking up a translation entry whose virtual address tag matches the virtual address in the plurality of translation entries based on the page size represented by die size flag hit of the translation entry; and translating the virtual address into a physical address based on the matching translation entry.

Optionally, in the address translation method according to the present invention, the translation lookaside buffer uses a fully associative structure, and the step of looking up a translation entry whose virtual address tag matches the virtual address in the plurality of translation entries based on the page size represented by the size flag bit of the translation entry includes: traversing the plurality of translation entries; for a traversed translation entry, truncating a virtual address tag from the to-be-translated virtual address based on a page size represented by a size flag bit of the translation entry; and comparing the truncated virtual address tag with a virtual address tag of the translation entry. If the two virtual address tags are equal, matching succeeds.

Optionally, in the address translation method according to die present invention, the translation lookaside buffer uses a set associative structure, and the step of looking up a translation entry whose virtual address tag matches the virtual address in the plurality of translation entries based on the page size represented by the size flag bit of the translation entry includes: traversing a preset page size set; for a traversed page size, truncating a virtual address tag and a virtual address index from the to-be-translated virtual address based on the page size; locating a to-be-matched translation entry set in the plurality of translation entries based on the truncated virtual address index; and when the traversed page size is equal to a page size represented by a size flag bit of a translation entry in the to-be-matched translation entry set, comparing the truncated virtual address tag with a virtual address tag of the translation entry in the to-be-matched translation entry set. If the two virtual address tags are equal, matching succeeds.

Optionally, in the address translation method according to the present invention, the step of translating the virtual address into a physical address based on the matching translation entry includes: acquiring a physical address tag from the matching translation entry; truncating an offset address from the virtual address; and splicing the physical address tag and the offset address to generate a translated physical address.

Optionally, the address translation method according to the present invention further includes; when address translation matching fails, initiating a backfill request to a lower-level cache by using the virtual address; and when the lower-level cache returns backfill content, filling the backfill content into a to-be-backfilled entry of the translation lookaside buffer.

According to still another aspect of the present invention, a processor is provided, including:

the memory management t it described above;

an instruction pre-fetch unit adapted to initiate an address translation request specific to a virtual address of a pre-fetch instruction to the memory management unit, and receive a physical address returned by the memory management unit; and a load/store unit adapted to initiate an address translation request specific to a virtual address of a load/store instruction to the memory management unit, and receive a physical address returned by the memory management unit.

According to still another aspect of the present invention, a system-on-chip is provided, including the processor described above.

According to still another aspect of the present invention, an intelligent device is provided, including the system-on-chip described above.

In the solutions of the present invention, the size flag bit is set in the entry. The size flag bit indicates an address translation size (page size) supported by the TLB entry, so that a single TLB tarn support a plurality of address translation sizes, achieving an access effect that needs to be originally implemented by using a plurality of TLBs. This improves utilization of the TLB entries and reduces power consumption for TLB access.

The foregoing description is merely an overview of the technical solutions of the present invention. In order to better understand the technical means of the present invention to implement the technical means based on content of the specification, and to make the foregoing and other objects, features and advantages of the present invention more comprehensible, the following describes specific embodiments of the present invention.

BRIEF DESCRIPTION OF THE DRAWINGS

Other advantages and benefits will become apparent to those of ordinary skill in the art by reading detailed description of the exemplary embodiments below. The accompanying drawings are merely intended to illustrate the objectives of the preferred embodiments and should not be interpreted as limiting the present invention. Throughout the accompanying drawings, the same reference numerals represent the same components. In the drawings.

DETAILED DESCRIPTION OF THE INVENTION

Exemplary embodiments of the present disclosure will be described below in more detail with reference to the accompanying drawings. Although the accompanying drawings show exemplary embodiments of the present disclosure, it should be understood that the present disclosure may be implemented in various forms and should not be limited by the embodiments described herein. Instead, these embodiments are provided so that the present disclosure will be better understood, and the scope of the present disclosure can be fully conveyed to those skilled in the art.

Figure 1:
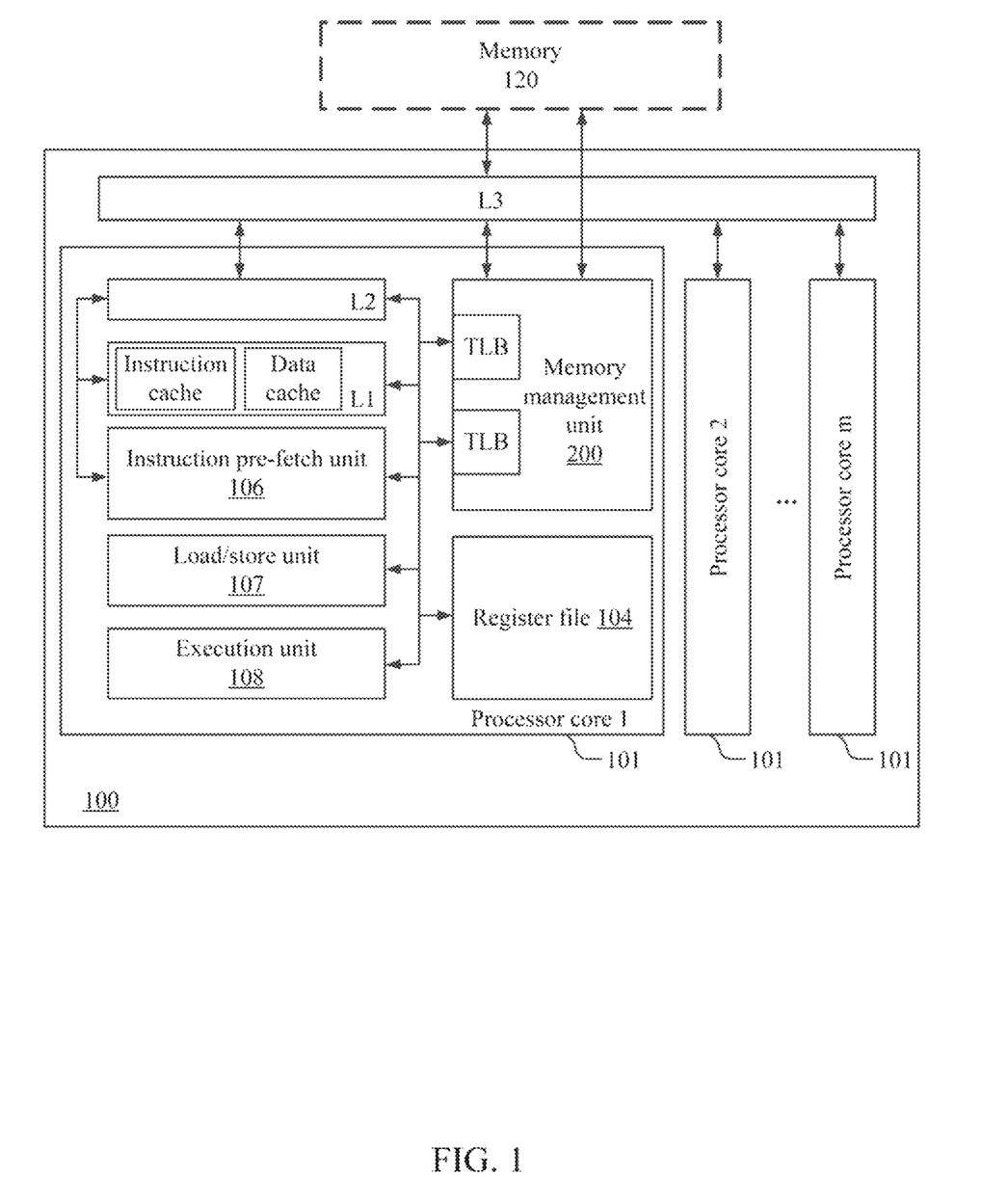
FIG. 1 illustrates a schematic structural diagram of a processor 100 according to one, embodiment of the present invention.

FIG. 1 illustrates a schematic structural diagram of a processor 100 according to one embodiment of the present invention. Referring to FIG. 1, the processor 100 may include one or more processor cores 101 (no processor cores are shown in the figure) used for processing instructions. Processing and execution of the instructions can be controlled by a user (for example, by using an application program) and/or a system platform. Each processor core may be used to process a specific instruction set. The instruction set can support complex instruction set computing (CISC), reduced instruction set computing (RISC), or computing based on very long instruction word (VLIW). Me processor core 101 may further include other processing modules, such as a digital signal processor (DSP).

The processor 100 may include a cache, and depending on different architectures, the cache in the processor 100 may be a single or multi-level internal cache (three-level caches L1 to L3 shown in FIG. 1) located within and/or outside each processor core 101, or may include an instruction-oriented instruction cache and data-oriented data cache. In some embodiments, various components in the processor 100 may share at least one part of the cache. As shown in FIG. 1, for example, the processor cores 1 to m share a level-3 cache L3. The processor 100 may also include an external cache (not shown), and another cache structure may also serve as the external cache of the processor 100.

The processor 100 may include a register file 104 (Register File). The register file 104 may include a plurality of registers for storing different types of data and/or instructions. These registers may be of different types. For example, the register file 104 may include an integer register, a floating-point register, a status register, an instruction register, a pointer register, and the like. A register in the register file 104 may be implemented by using tr general-purpose register, or may use specific design depending on actual requirements of the processor 100.

The processor 100 may include a memory management unit (MMU) 200, and the memory management unit 200 may provide one or more translation lookaside buffers (TLB). The TLB caches a mapping relationship between a virtual address page and a physical address page, so as to implement translation from a virtual address to a physical address. One or more memory management units 200 may be disposed in each processor core 101, and a memory management unit 200 in one processor core 101 may be synchronized with a memory management unit 200 located in another processor or processor core, so that each processor or processor core can share a virtual storage system.

In some embodiments, an internal interconnection structure is used to make the memory management units 200 interact with other processor cores via an internal bus of the system-on-chip, or directly connect to other modules within the system-on-chip for signal exchange.

The memory management unit 200 may communicate with an instruction pre-fetch unit 106 used for pre-fetch instructions in the'processor 100, and/or a load/store unit (LSU) 107 used for loading/storing data.

The instruction pre-fetch unit 106 accesses TLB entries of the memory management unit 200 by using a virtual address of a pre-fetch instruction to translate a physical address of the pre-fetch instruction. The instruction pre-fetch unit 106 performs addressing in a physical storage space by using the physical address translated by the memory management unit 200 to obtain a corresponding instruction. An execution unit 108 in the processor core 101 may receive the instruction acquired by the instruction pre-fetch unit 106 and processes (for example, decodes) the instruction, so as to execute the instruction.

The load/store unit 107 is adapted to load data from the physical storage space, to a corresponding register according to a load instruction, or store data of a register into a corresponding physical storage space according to a store instruction. The register includes, for example, an address register, a step register, and an address mask register in the register file 104. The load/store unit 107 accesses the TLB entries of the memory management unit 200 based on a virtual address of a load/store instruction, and the memory management unit 200 provides a translated physical address specific to the load/suite instruction to the load/store unit 107, so that the load/store unit 107 can access corresponding data based on the physical address. For example, the load/store instruction includes: an LDR instruction used for writing a word into the register, an QTR instruction used for saving words in the register into a storage device, an LSRB instruction used for writing a byte into the register, and so on.

Figure 2:
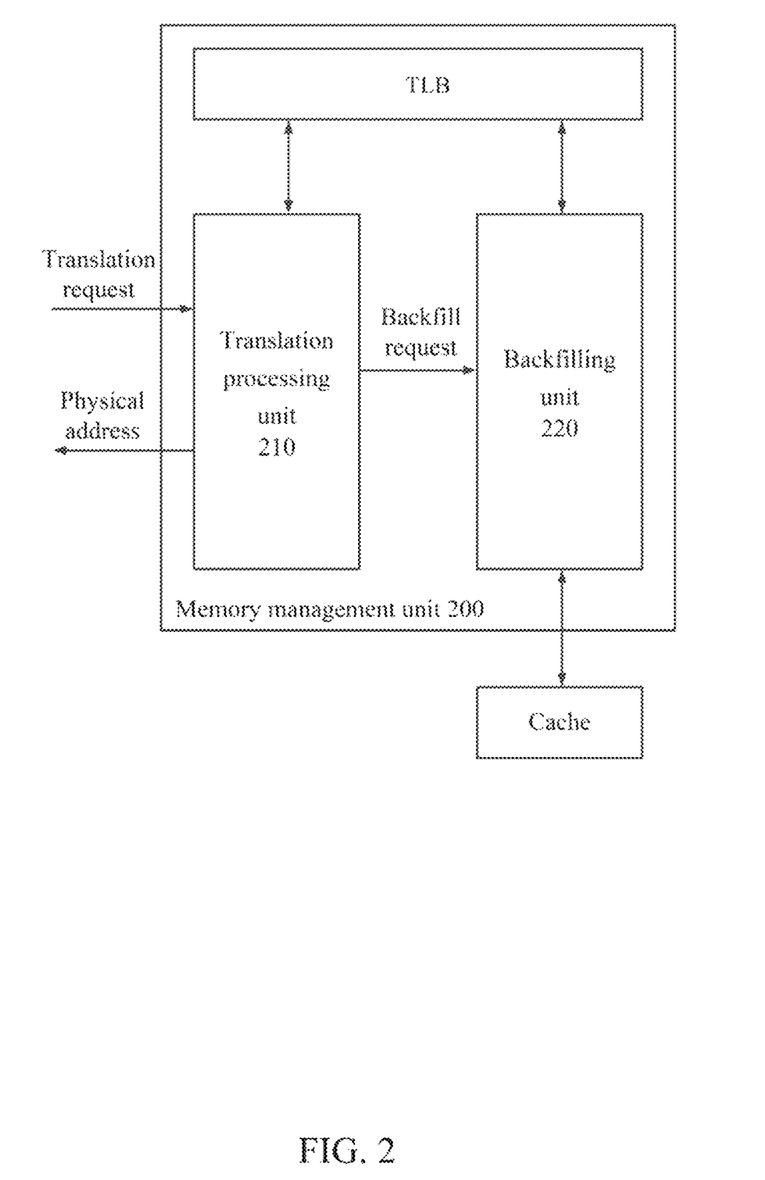
FIG. 2 illustrates a schematic structural diagram of a memory management unit 200 according to one embodiment of the present invention.

FIG. 2 illustrates a schematic structural diagram of a memory management unit 200 according to one embodiment of the present invention. Referring to FIG. 2, one or more TLBs (one TLB is shown in the figure) are disposed in the memory management unit. Different TLBs may be independent of one another or be controlled synchronously. Different TLBs may alternatively be at different levels to form a multi-level cache structure. An instruction TLB and a data TLB may be disposed in the memory management unit 200. The instruction TLB is used for caching an instruction cache entry corresponding to an instruction read/write address. The data TLB is used for caching a data cache entry corresponding to a data read/write address. For example, the instruction TLB is used to receive a translation request initiated by the instruction pre-fetch unit 106 and return a corresponding physical address to the instruction pre-fetch unit 106. For example, the data TLB is used to receive a translation request initiated by the load/store unit 107 and return a corresponding physical address to the load/store; unit 107.

As shown in FIG. 2, the memory management unit 200 further includes a translation processing unit 210 and a backfilling unit 220. The translation processing unit 210 is adapted to look up a TLB entry (translation entry) that matches a to-be-translated virtual address in the TLB based on an address translation request, and translate the virtual address into a physical address based on the matching translation entry.

Because the TLB is merely a backup of partial content of a main memory, an entry miss may occur when the translation processing unit 210 accesses the TLB. When the entry miss occurs in the TLB, backfill content for the request may be obtained from the main memory or a lower-level TLB, so as to fill the backfill content into a to-be-bad-dined entry of the TLB. Specifically, if the translation processing unit 210 finds no TLB entry matching the to-be-translated virtual address in the TLB, that is, matching fails, the translation processing unit 210 sends a backfill request to the backfilling unit 220. The backfill request carries the unmatched to-be-translated virtual address. Based on the backfill request that is initiated by the translation processing unit 210 when matching tails, the backfilling unit 220 uses the unmatched virtual address to initiate a backfill request to a lower-level each; and when the lower-level cache returns backfill content, fills the backfill content into the to-be-backfilled entry of the TLB. The lower-level cache is a TLB or a memory page table.

In this embodiment of the present invention, the translation lookaside, buffer TLB may include hardware components and/or software programs, which are, for example, implemented by a plurality of registers. Each TLB entry may be stored independently in a corresponding register, and the TLB may also include a register for storing instructions such as a read instruction and a write instruction.

In this embodiment of the present invention, to implement that one TLB supports a plurality of address translation sizes (page sizes), a page size flag bit is set in a TLB entry structure. In this way, the TLB entry may, for example, include an entry validity bit representing whether an address translation relationship stored in the entry is valid, where, for example, an entry validity bit being 0 represents an invalid address translation relationship and the entry cannot be used for address translation; and an entry validity bit being 1 represents a valid address translation relationship, and the entry can be used for address translation. The TLB entry may also, for example, include a virtual address tag bit representing a virtual address tag (virtual tag) of the address translation relationship stored in the entry, which may also be referred to as a virtual page number (VPN), indicating a virtual page. The TLB entry may also, for example, include a physical address tag bit representing a physical address tag (physical tag) of the address translation relationship stored in the entry, which may also be referred to as a physical page number (PPN), indicating a physical page. The TLB entry may also, for example include a page size flag bit, where the page size flag bit may be a binary code of one or more bits and is used to identify an address translation size supported by the TLB entry, that is, a page size of a virtual page represented by the virtual address tag; for example, a page size flag bit being 00 indicates a page size of 4 KB while a page size flag bit being 01 indicates a page size of 8 KB. The TLB entry may also, for example, include a page address attribute bit mainly indicating information such as read/write access permission, security access permission, and cacheability permission.

In this embodiment of the present invention, the size flag bit is set for the TLB entry, and the size flag bit indicates the address translation size supported by the TLB entry. The size flag bit in the TLB entry can be dynamically set based on a page size actually assigned by an operating system. During backfilling, the backfill entry content may be filled in the to-be-backfilled entry of the TLB, and page size information of the backfill entry content is configured in the size flag bit of the to-be-backfilled entry. In this way, a single TLB can support a plurality of address translation sizes. Correspondingly, when receiving an address translation request, the translation processing unit 210 looks up a TLB entry that matches the to-be-translated virtual address in the TLB based on a page size represented by a size flag bit of the TLB entry, and translates a virtual address into a physical address based on the matching translation entry.

Generally, a TLB organization structure includes fully associative mapping and set associative mapping. Fully associative mapping, is an organization thrill of cache (Cache). This organization form allows mapping of any unit block in the main memory to any entry in the cache. Fully associative mapping is more flexible and efficient to the cache. However, a comparison circuit of the fully associative structure occupies more resources and features a poorer time sequence, and therefore fully associative mapping is typically applicable to small-capacity caches.

For set associative mapping, stored content is grouped based on lower bits of addresses. A grouping basis is referred to as index. One unit block of the main memory may be mapped only to an entry whose address index value is equal to that of the unit block, that is, a same-set entry. Though less flexible than fully associative mapping, set associative mapping has relatively simple read circuits and is applicable to, large-capacity caches.

In this way, in this embodiment of the present invention, a set associative TLB can be used as a lower-level cache of a fully associative TLB. Certainly, the present invention is not limited thereto, and the set associative TLB may also be used as a first-level cache.

In some embodiments, when the TLB uses a frilly associative structure, the translation processing unit 210 performs the following address translation logic; traversing a plurality of TLB entries in the TLB; for a traversed TLB entry, truncating a virtual address tag from the to-be-translated virtual address based on a page size represented by a size flag bit of the TLB entry; comparing the truncated virtual address tag with a virtual address tag of the translation entry, where if the two virtual address tags are equal, matching succeeds; if the two virtual address tags are unequal, match processing is performed on a next TLB entry; and if none of the TLB entries are matched, a backfill request is initiated to the backfilling unit 220; and when matching succeeds, acquiring a physical address, tag from the matching TLB entry, truncating an offset address from the to-be-translated virtual address, and splicing the physical address tag, and the offset address to generate a translated physical address.

When receiving a backfill request, the backfilling unit 220 initiates a backfill request to a lower-level cache (a TLB or a memory page table) by using a virtual address, and when the lower-level cache returns backfill content, fills information such as a virtual address tag a physical address tag, and a page address attribute of the backfill content into a to-be-backfilled entry of the TLB, and sets a size flag hit of the to-be-backfilled entry based on an address translation size (namely, a page size) of the backfill content.

In some embodiments, when the TLB uses a set associative structure, the translation processing unit 210 performs the following address translation logic; traversing a preset page size set, where the page size set is a set formed by all possible address translation sizes that are supported by one TLB, that is, the page size set includes a plurality of page sizes; for a traversed page size, truncating a virtual address tag and a virtual address index from the to-be-translated virtual address based on the page size; locating a to-be-matched translation entry set in the plurality of translation entries based on the truncated virtual address index; comparing the traversed page size with a page size represented by a size flag bit of a translation entry in the to-be-matched translation entry set, and if the two page sizes are equal, further comparing the truncated virtual address tag with a virtual address tag of the translation entry in the to-be-matched translation entry set, where if the two virtual address tags are equal, matching succeeds; and if the two page sizes are unequal or the two virtual address tags are unequal, processing is performed based on a next page size in the page size set; and if no matching TLB entry is found when all the page sizes are traversed, initiating a backfill request to the backfilling unit 220; or if a TLB entry is successfully matched, acquiring a physical address tag from the matching TLB entry, truncating an offset address from the to-be-translated virtual address, and splicing the physical address tag and the offset address to generate a translated physical address.

When receiving the backfill request, the backfilling unit 220 initiates a backfill request to the lower-level cache (the TLB or the memory page table) by using the virtual address, and when the lower-level cache returns backfill content, calculates a corresponding backfill virtual address tag and backfill index based on a page size of the backfill content, writes information such as a backfill virtual address tag, a physical address tag, and a page address attribute into a to-be-backfilled entry corresponding to the backfill index in the TLB, and sets a size flag bit of the to-be-backfilled entry based on an address translation size (that is, the page size) of the backfill content.

In some embodiments, the memory management unit also includes a size register. When matching succeeds, the translation processing unit 210 further saves the page size used for successful matching into the size register. In this way, during next-time translation processing, the translation processing unit 210 first acquires the stored page size from the size register, then traverses the page size set from the acquired page size, that is, calculates the virtual address tag and the virtual address index starting from the saved page size, and then performs subsequent location and comparison processing. In programs with good locality of reference (Locality of Reference), a hit result can be obtained based on fewer times of access in this manner.

Figure 3:
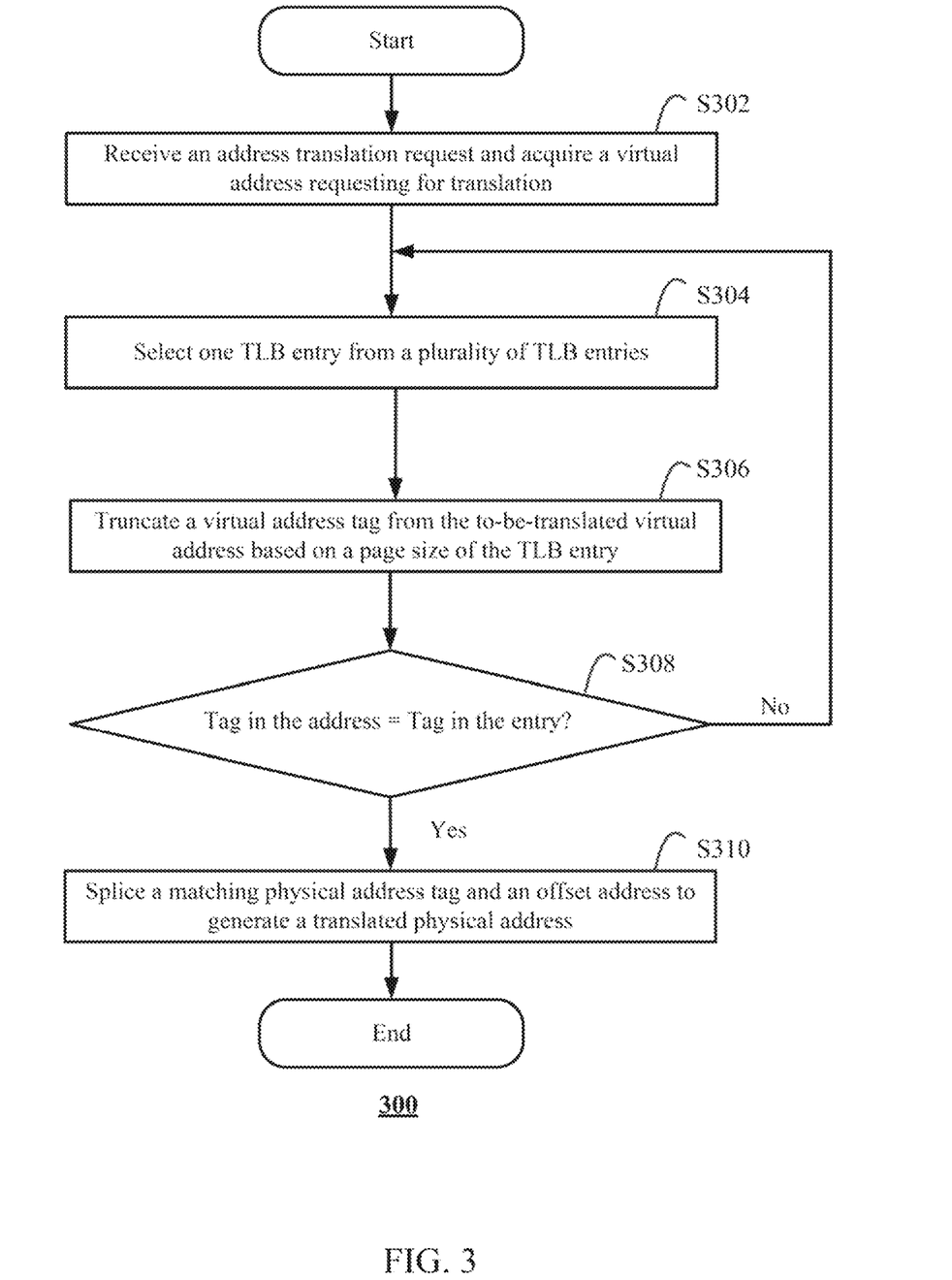
FIG. 3 illustrates a flowchart of an address translation method 300 according to one embodiment of the present invention.
Figure 4:
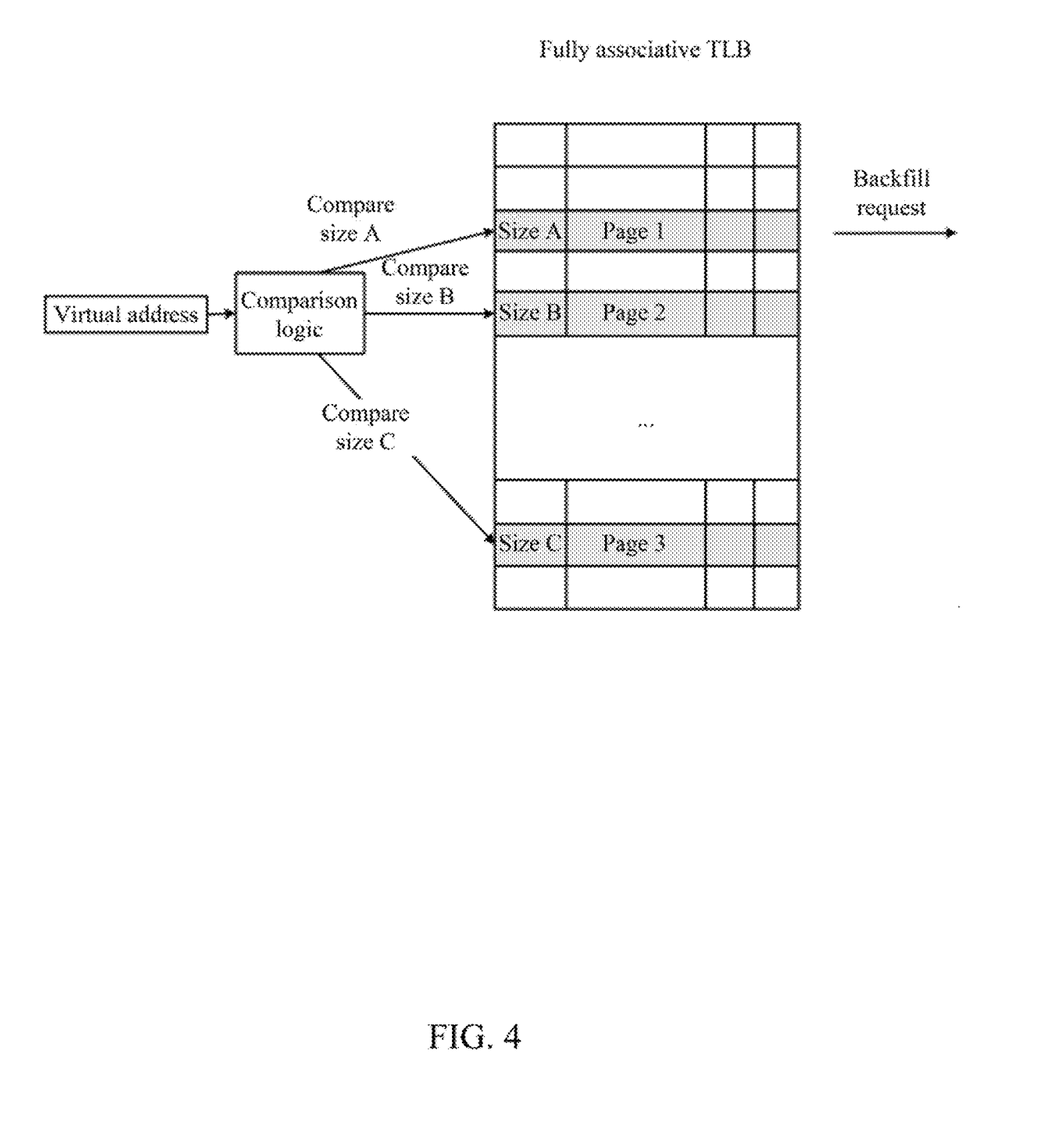
FIG. 4 illustrates a principle diagram of a method 300 according to an embodiment of the present invention.

FIG. 3 illustrates a flowchart of an address translation method 300 according to one embodiment of the present invention. The method 300 is applicable to address translation based on a TLB with a fully associative structure. For a principle of address translation, refer to FIG. 4. The method 300 includes steps S302 to S310.

In step S302, an address translation request is received, and a virtual address requesting for translation is acquired. The address translation request may be initiated by an instruction pre-fetch unit 106 when a virtual address of a pre-fetch instruction needs to be translated into a physical address, or may be initiated by a load/store unit 107 when a virtual address of a load/store instruction needs to, be translated into a physical address, or may be initiated when address translation based on a higher-level TLB fails and backfilling is required.

In step S304, a plurality of TLB entries included in the TLB are traversed. In step S306, for a traversed TLB entry, a virtual address tag is truncated from a to-be-translated virtual address based on a page size represented by a size flag bit of the TLB entry. It is assumed that the virtual address is 32 bits and the TLB supports a total of four page sizes: 4 KB, 16 KB, 64 KB, and 2 MB. A size flag bit of the TLB entry is represented by a 2-bit binary code, for example, 00 represents a 4 KB page, 01 represents a 16 KB page, 10 represents a 64 KB page, and 11 represents a 2 MB page. For the 4 KB page, a corresponding virtual address is 32 bits A[31:0], a corresponding virtual address tag (that is, a virtual page number VPN) is upper 20 bits A[31:12], and a corresponding offset address (VPO) is lower 12 bits A[11:0]. For the 2 MB page, a corresponding virtual address is 32 bits A[31:0], a corresponding virtual address tag (that is, a virtual page number VPN) is upper 11 bits A[31:21], and a corresponding offset address (VPO) is lower 21 bits A[20:0].

In step S308, the truncated virtual address tag is compared with the virtual address tag of the TLB entry. If the two virtual address tags are equal, matching succeeds and, step S310 is performed; if the two virtual address tags are unequal, step S304 is performed for match processing on a next TLB entry and if none of the TLB entries are matched, a backfill request is initiated to the backfilling unit 220.

In step S310, when matching succeeds, a physical address tag is acquired from the matching TLB entry, an offset address is truncated from the to-be-translated virtual address, and the physical, address tag and the offset address are spliced to generate a translated physical address.

The method 300 may further include: when none of the TLB entries are matched, a backfill request is initiated to a lower-level cache (a TLB or a memory page table) by using the virtual address, and when the lower-level cache returns backfill content, information such as a virtual address tag, a physical address tag, and a page address attribute of the backfill content is filled into a to-be-backfilled entry of the TLB, and a size flag bit of the to-be-backfilled entry is set based on an address translation size (namely, a page size) of the backfill content.

Figure 5:
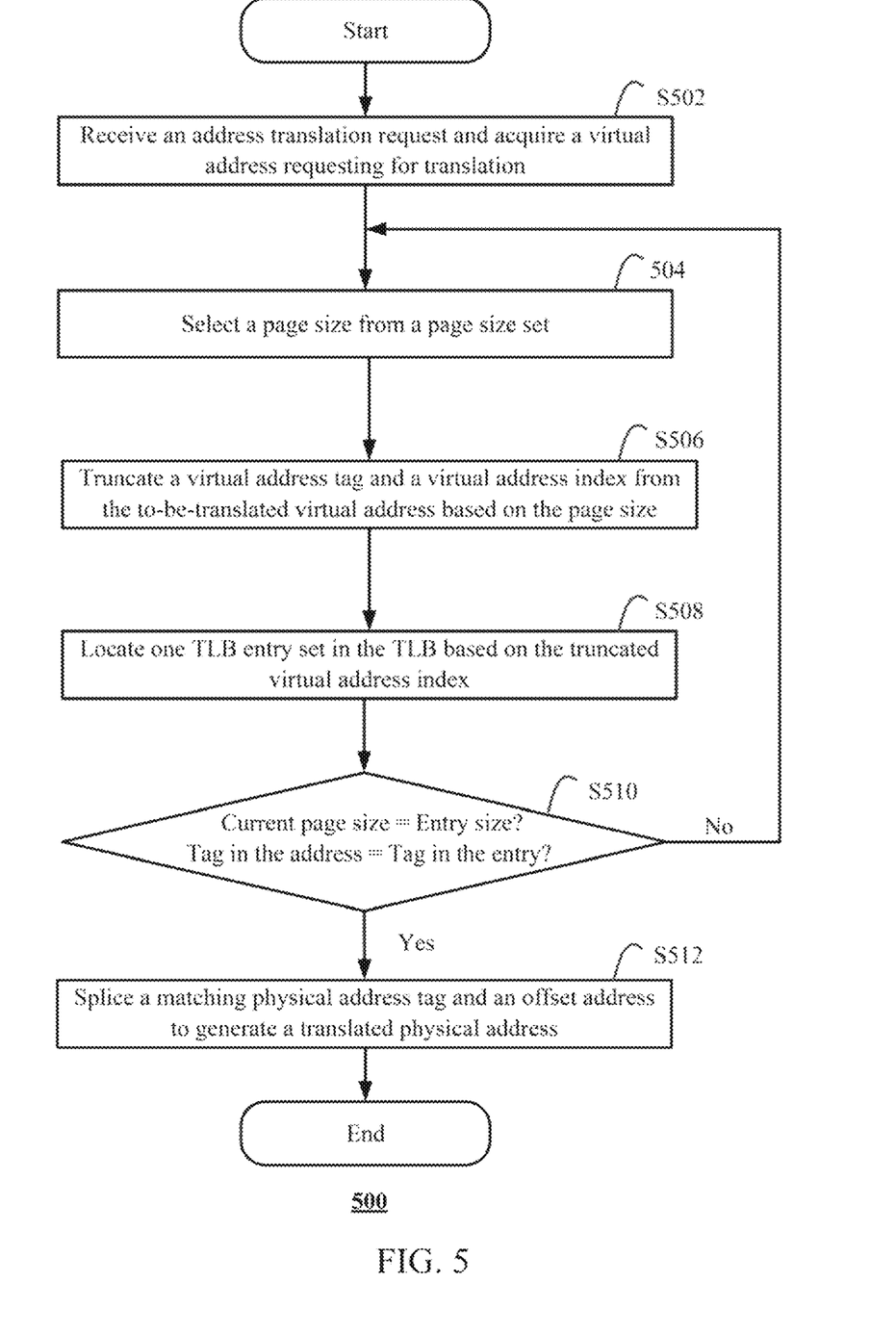
FIG. 5 illustrates a flowchart of an address translation method 500 according to another embodiment or the present invention.
Figure 6:
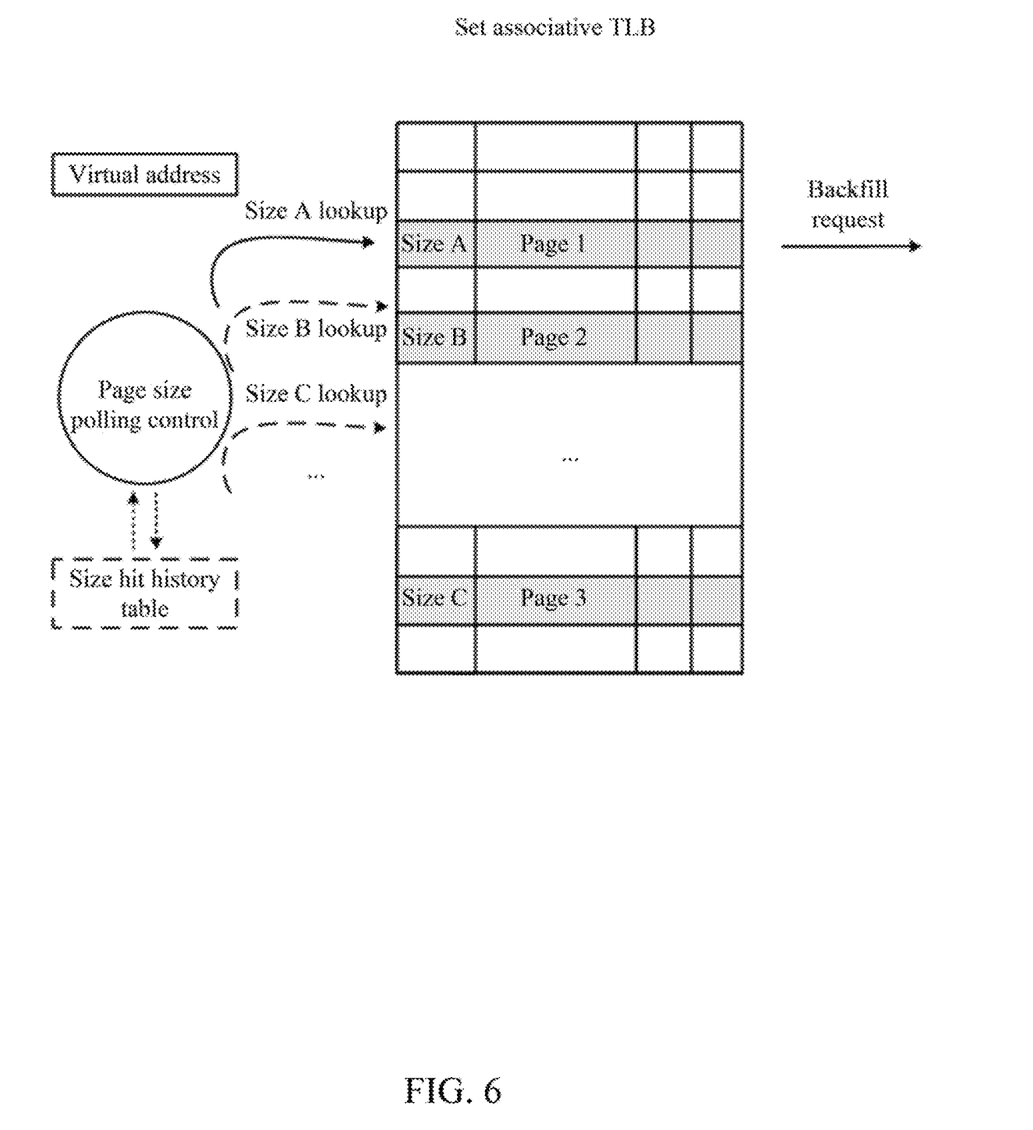
FIG. 6 illustrates a principle diagram of a method 500 according to an embodiment of the present invention.

FIG. 5 illustrates a flowchart of an address translation method 500 according to one embodiment of the present invention. The method 500 is applicable to address translation based on a TLB with a set associative structure. For a principle of address translation, refer to FIG. 6. The method 500 includes steps S502 to S512.

In step S502, an address translation request is received, and a virtual address requesting for translation is acquired. The address translation request may be initiated by an instruction pre-fetch unit 105 when a virtual address of a pre-fetch instruction needs to be translated into a physical address, or may be initiated by a load/store unit 107 when a virtual address of a load/store instruction needs to be translated into a physical address, or may be initiated when address translation based on a higher-level TLB fails and backfilling is required.

In step S504, a preset page size set is traversed. The preset page size set is a set formed by all possible address translation sizes that are supported by one TLB, that is, the page size set includes a plurality of page sizes. For example, the TLB supports a total of four page sizes, namely, 4 KB, 16 KB, 64 KB, and 2 MB, and the page size set is {4 KB, 16 KB, 64 KB, 2 MB}. A size flag bit of a TLB entry is represented by a 2-bit binary code, for example, 00 represents a 4 KB page, 01 represents a 16 KB page, 10 represents a 64 KB page, and 11 represents a 2 MB page.

In step S506, for a traversed page size, a virtual address tag and a virtual address index are truncated from the to-be-translated virtual address based on the page size. In a manner of set associative mapping, the virtual address can be divided into three parts in descending order of bits of the address: a virtual address tag, a virtual address index, and an offset address. The virtual address tag is used to compare with a virtual address tag in the TLB entry, so as to determine whether the TLB entry is hit. The virtual address index is used to index a TLB entry set in the TLB.

It is assumed that the virtual address is 32 bits and the address index is a 3-bit binary code. In this case, for the 4 KB page, the corresponding virtual address is 32 bits A[31:0], the virtual address tag is upper 17 bits A[31:15], the virtual address index is middle 3 bits A[14:12], and the offset address is lower 12 bits A[11:01]. For the 2 MB page, the corresponding virtual address is 32 bits A[31:0], the virtual address tag is upper 8 bits A[31:23], the virtual address index is middle 3 bits A[23:21], and the offset address is lower 21 bits A[20:0].

In step S508, a TLB entry set is located in the TLB based on the truncated virtual address index. The TLB entry set includes a plurality TLB entries. The TLB entry set is hereinafter referred to as a to-be-matched TLB entry set. For example, if the TLB is in a four-path set associative manner, the TLB entry set includes four TLB entries.

In step S510, the current page size being traversed is compared with a page size (referred to, as an entry size) represented by a size flag bit of a TLB entry in the to-be-matched TLB entry set. If the two page sizes are equal, a truncated virtual address tag is further compared with a virtual address tag of the TLB entry in the to-be-matched TLB entry set. If the two virtual address tags are equal, matching succeeds; and if the two page sizes are unequal or the two virtual address tags are unequal, step S504 is performed to process a next page size in the page size set. If no matching MB entry is found when all page sizes are traversed, a backfill request is initiated to the back-filling unit 220.

In step S512, when matching succeeds, a physical address tag is, acquired from the matching TLB entry, an offset address is truncated from the to-be-translated virtual address, and the physical address tag and the offset address are spliced to generate a translated physical address.

The method 500 may further include: when no matching TLB entry is found and the backfilling unit 220 receives the backfill request, the backfilling unit 220 initiates a backfill request to the lower-level cache (the TLB or the memory page table) by using the virtual address, and when the lower-level cache returns backfill content, calculates a corresponding backfill virtual address tag and backfill index based on a page size of the backfill content, writes information, such as a backfill virtual address tag, a physical address tag, and a page address attribute, into a to-be-backfilled entry corresponding to the backfill index in the TLB, and sets a size flag bit of the to-be-backfilled entry based on an address translation size (that is, the page size) of the backfill content.

Figure 7:
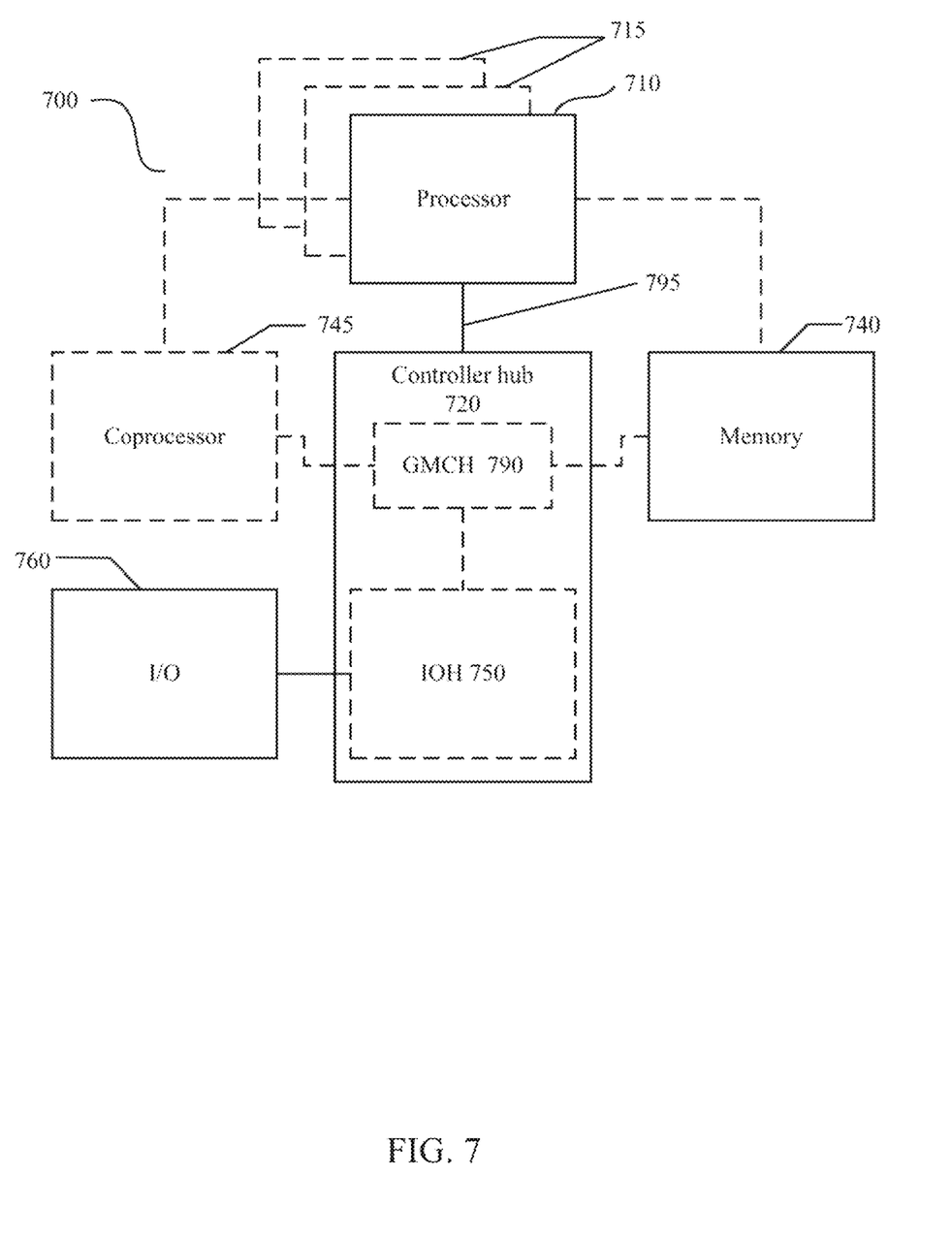
FIG. 7 illustrates a schematic diagram of a computer system 700 according to one embodiment of the present invention.

In some embodiment's, for polling access to the TLR with the set associative structure, a streamlined manner may be selected to sequentially send query requests of all page sizes to the TLB, thereby reducing, polling access time, FIG. 7 illustrates a schematic diagram of a computer system 700 according to one embodiment of the present invention. The computer system 700 shown in FIG. 7 may be applied to laptops, desktop computers, hand-held PCs, personal digital assistants, engineering workstations, servers, network devices, network hubs, switches, embedded processors, digital signal processors (DSP), graphics devices, video game devices, set-top boxes, microcontrollers, cellular phones, portable media players, hand-held devices, and various other electronic devices. The present invention is not limited thereto, and all systems capable of incorporating the processors and/or other execution logic disclosed in the specification are included in the protection scope of the present invention.

As shown in FIG. 7, the system 700 may include one or more processors 710 or 715. These processors are coupled to a controller hub 720. In one embodiment, the controller hub 720 includes a Graphics Memory Controller Hub (GMCH) 790 and an Input/Output Hub (IOH) 750 (which may be located on separate chips). The 790 includes a memory controller and a graphics controller that are coupled to a memory 740 and a coprocessor 745. The IOH 750 couples an Input/Output (I/O) device 760 to the GMCH 790. Alternatively, the memory controller and the graphics controller are integrated in the processor, so that the memory 740 and the coprocessor 745 are directly coupled to the processor 710. In this case, the controller hub 720 includes only the IOH 750.

The optional nature of the additional processor 715 is denoted by dashed lines in FIG. 7. Each processor 710 or 715 may include one or more processor cores described herein, and may be a version of the processor 100.

The memory 740 may be, for example, a Dynamic Random-Access Memory (DRAM), a Phase Change Memory (PCM), or a combination thereof. In at least one embodiment, the controller hub 720 communicates with the processors 710 or 3715 via, a multi-drop bus (multi-drop bus) such as a Front Side Bus (FSB), a point-to-point interface such as a Quick Path Interconnect (QPI), or a similar connection 795.

In one embodiment, the coprocessor 745 is a dedicated processor, for example, a high-throughput MIC processor, a network or communication processor, a compression engine, a graphics processing unit, a general purpose graphics processing unit (GPGPU), or an embedded processor. In one embodiment, the controller hub 720 may include an integrated graphics accelerator.

In one embodiment, the processor 710 executes instructions that control a general type of data processing operations. What are embedded in these instructions may be coprocessor instructions. The processor 710 identifies, for example, these coprocessor instructions of types that should be executed by the attached coprocessor 345. Therefore, the processor 710 issues these coprocessor instructions (or control signals representing coprocessor instructions) to the coprocessor 745 over a coprocessor bus or other interconnects. The coprocessor 745 receives and executes the received coprocessor instructions.

Figure 8:
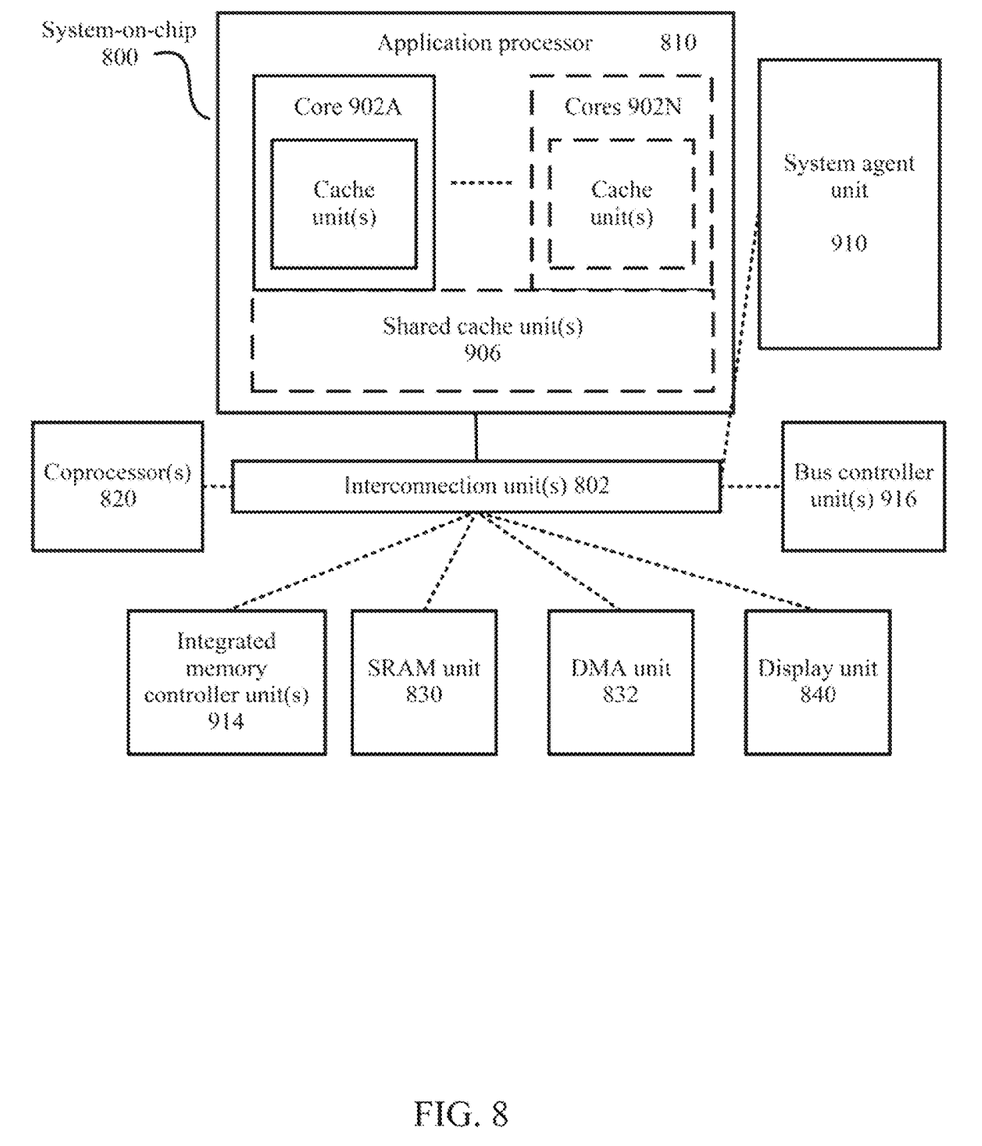
FIG. 8 illustrates a schematic diagram of an on-chip system (SoC) 800 according to one embodiment of the present invention.

FIG. 8 illustrates a schematic diagram of an on-chip system (SoC) 800 according to one embodiment of the present invention. The application processor 810 included in the system-on-chip shown in FIG. 8 may be the processor 100 shown in FIG. 1. As illustrated in FIG. 8, an interconnection unit 802 is coupled to an application processor 810, a system agent unit 910, a bus controller unit 916, an integrated memory controller unit 914, one or more coprocessors 820, a Static Random Access Memory (SRAM) unit 830, a Direct Memory Access (DMA) unit 832, and a display unit 840 for being coupled to one or more external displays. The application processor 810 includes a set of one or more cores 902A to 902N, and a shared cache unit 906. The coprocessor 820 includes an integrated graphics logic, an image processor, an audio processor, and a video processor. In one embodiment, the coprocessor 820 includes a dedicated processor, for example, a network or communication processor, a compression engine, a GPGPIT, a high-throughput MIC processor, or an embedded processor.

In addition, the system-on-chip described may be included in an intelligent device to implement corresponding functions in the intelligent device, including but not limited to executing related control programs, data analysis, computing and processing, network communication, controlling peripherals of the intelligent device, and so on.

Such intelligent devices include dedicated intelligent devices such as mobile terminals and personal digital terminals. The devices include one or more system-on-chips of the present invention to perform data processing or control peripherals of the device.

Such intelligent devices also include dedicated devices designed for specific functions, for example, smart speakers and smart display devices. These devices include the system-on-chip of the present invention to control a speaker or a display device, so as to provide the speaker or the display device with additional functions of communication, perception, data processing, and the like.

Such intelligent devices also include various IoT and AIoT devices. These devices include the system-on-chip of the present invention to perform data processing, for example, AI computing or data communication and transmission, thereby implementing denser and more intelligent device distribution.

Such intelligent devices may also be used in a vehicle, for example, may be implemented as a vehicle-mounted device or may be built into the vehicle, so as to provide a data-processing capability for intelligent driving of the vehicle.

Such intelligent devices may also be used in the home and entertainment field, for example, may be implemented as a smart speaker, a smart air conditioner, a smart refrigerator, a smart display device, or the like. These devices include the system-on-chip of the present invention to perform data processing and peripheral control, making home and entertainment devices intelligent.

In addition, such intelligent devices may also be used in the industrial field, for example, may be implemented as an industrial control device, a sensing device, an IoT device, an AIoT device, a braking device, or the like. These devices include the system-on-chip of the present invention to perform data processing and peripheral control, making industrial equipment intelligent.

The foregoing description of intelligent devices is merely exemplary, and the intelligent device according to the present invention is not limited thereto. All intelligent devices capable of performing data processing by using the system-on-chip of the present invention fall within the protection scope of the present invention.

All the embodiments of the mechanisms disclosed herein may be implemented in hardware, software, firmware, or a combination thereof. The embodiments of the present invention may be implemented as computer programs or program code executed on a programmable system. The programmable system includes at least one processor, a storage system (including volatile and non-volatile memories and/for storage elements), at least one input device, and at least one output device.

It should be understood that, for the purpose of streamlining the present disclosure and aiding in the understanding of one or more of the inventive aspects, in the foregoing description of the exemplary embodiments of the present invention, various features of the present invention are sometimes grouped together into a single embodiment, diagram, or description thereof. However, the disclosed method is not to be interpreted as reflecting an intention that the claimed invention requires more features than those expressly recited in each claim. Rather, as the following claims reflect, inventive aspects lie in less than all features of a single embodiment disclosed above. Therefore, the claims following the detailed description are hereby expressly incorporated into this detailed description, with each claim standing on its own as a separate embodiment of the present invention.

Those skilled in the art should understand that the modules, units or components of the devices in the examples disclosed herein may be arranged in the devices described in the embodiments, or alternatively located in one or more devices different from the devices in the examples. The modules described in the foregoing examples may be combined into one module or may be divided into a plurality of submodules.

Those skilled in the art can understand that the modules in the devices in the embodiments may be adaptively changed and provided in one or more devices different from the devices in the embodiments. The modules, units or components in the embodiments may be combined into one module, unit or component, and in addition, they may be divided into a plurality of submodules, subunits, or subcomponents. All features disclosed in the description (including the accompanying claims, abstract and drawings), and all processes or units of any methods or devices so disclosed, may be combined in any way, except that at least some of such features and/or processes or units are mutually exclusive. Unless otherwise clearly stated, each feature disclosed in the description (including the accompanying claims, abstract and drawings) may be replaced, by alternative features serving the same, equivalent or similar purpose.

In addition, those skilled in the art can understand that, although some of the embodiments described herein include some but not other features included in other embodiments, combinations of features of different embodiments are meant to be within the scope of the present invention and form different embodiments. For example, in the following claims, any one of the claimed embodiments may be used in any combination.

In addition, some of the embodiments are described herein as a combination of methods or method elements that can be implemented by a processor of a computer system or by other devices that execute the functions. Therefore, a processor having necessary instructions for implementing the methods or method elements forms a device for implementing the methods or method elements. In addition, the elements described in the device embodiments are examples of devices for implementing functions executed by elements for the purpose of implementing the present invention.

As used herein, unless otherwise specified, the use of ordinals "first", "second", "third", and the like to describe general objects merely represents different instances involving similar objects, and is not intended to imply that objects so described must have given order in time, space, sorting or any other aspects.

Although the present invention has been described according to a limited quantity of embodiments, benefiting from the foregoing description, those skilled in the art can understand that other embodiments may be conceived of within the scope of the present invention described thereby. In addition, it should be noted that the language used in the specification is mainly selected for readability and teaching, purposes, rather than for interpreting or defining the subject of the present invention. Therefore, many modifications and variations made without departing from the scope and spirit of the appended claims are apparent to persons of ordinary skill in the art. In regard to the scope of the present invention, the disclosure of the present invention is descriptive rather than restrictive, and the scope of the present invention should be defined by the appended claims.

What is claimed is:

1. A memory management unit, comprising:
a translation lookaside buffer adapted to:
store a plurality of translation entries, wherein each translation entry comprises a size flag bit, a virtual address tag, and a physical address tag, wherein the virtual address tag represents a virtual page, the physical address tag represents a physical page corresponding to the virtual page, and the size flag bit represents a page size of the virtual page; and
receive an address translation request and acquire a virtual address requesting for translation;

a translation processing unit adapted to:
  look up, in response to the address translation request, a translation entry whose virtual address tag matches the virtual address in the plurality of translation entries based on the page size represented by the size flag bit of the translation entry; and
  translate the virtual address into a physical address based on the matching translation entry; and
a backfilling unit adapted to:
  fill backfill content into a to-be-backfilled entry of the translation lookaside buffer, when a lower-level cache returns the backfill content; and
  set a size flag bit of the to-be-backfilled entry based on a page size of the backfill content.

2. The memory management unit according to claim 1, wherein the translation lookaside buffer uses a fully associative structure, and wherein the translation processing unit is further adapted to:
  traverse the plurality of translation entries;
  for a traversed translation entry, truncate a virtual address tag from the virtual address based on a page size represented by a size flag bit of the traversed translation entry; and
  compare the truncated virtual address tag with a virtual address tag of the traversed translation entry, wherein if the two virtual address tags are equal, matching succeeds.

3. The memory management unit according to claim 1, wherein the translation lookaside buffer uses a set associative structure, and wherein the translation processing unit is further adapted to:
  traverse a preset page size set;
  for a traversed page size of the preset page size set, truncate a virtual address tag and a virtual address index from the virtual address based on the traversed page size;
  locate a to-be-matched translation entry set in the plurality of translation entries based on the truncated virtual address index; and
  when the traversed page size is equal to a page size represented by a size flag bit of a translation entry in the to-be-matched translation entry set, compare the truncated virtual address tag with a virtual address tag of the translation entry in the to-be-matched translation entry set, wherein if the two virtual address tags are equal, matching succeeds.

4. The memory management unit according to claim 3, further comprising a size register, wherein when the translation processing unit succeeds in matching, the page size used for successful matching is further saved into the size register; and
  during next-time translation processing, the translation processing unit first acquires a stored page size from the size register and then traverses the preset page size set starting from the acquired page size.

5. The memory management unit according to claim 1, wherein when the matching translation entry is found, the translation processing unit translates the virtual address into the physical address in the following manner:
  acquiring a physical address tag from the matching translation entry;
  truncating an offset address from the virtual address; and
  splicing the physical address tag and the offset address to generate a translated physical address.

6. The memory management unit according to claim 1, wherein the backfilling unit is further adapted to, when the translation processing unit fails in matching, initiate a backfill request to the lower-level cache by using the virtual address.

7. The memory management unit according to claim 6, wherein the lower-level cache is a translation lookaside buffer or a memory page table.

8. A processor, comprising:
  the memory management unit according to claim 1;
  an instruction pre-fetch unit adapted to initiate an address translation request specific to a virtual address of a pre-fetch instruction to the memory management unit, and receive a physical address, corresponding to the virtual address of the pre-fetch instruction, returned by the memory management unit; and
  a load/store unit adapted to initiate an address translation request specific to a virtual address of a load/store instruction to the memory management unit, and receive a physical address, corresponding to the virtual address of the load/store instruction, returned by the memory management unit.

9. A system-on-chip, comprising the processor according to claim 8.

10. An intelligent device, comprising the system-on-chip according to claim 9.

11. The processor according to claim 8, wherein the translation lookaside buffer comprises an instruction translation lookaside buffer and a data translation lookaside buffer, wherein the instruction translation lookaside buffer is adapted to receive the address translation request initiated by the instruction pre-fetch unit, and wherein the data translation lookaside buffer is adapted to receive the address translation request initiated by the load/store unit.

12. The memory management unit according to claim 1, wherein each translation entry further comprises a page address attribute bit indicating at least security access permission and cacheability permission.

13. An address translation method, applicable for being executed in a memory management unit, wherein the memory management unit provides a translation lookaside buffer, wherein the translation lookaside buffer is adapted to store a plurality of translation entries, wherein each translation entry comprises a size flag bit, a virtual address tag, and a physical address tag, wherein the virtual address tag represents a virtual page, the physical address tag represents a physical page corresponding to the virtual page, and the size flag bit represents a page size of the virtual page, and wherein the address translation method comprises:
  receiving an address translation request and acquiring a virtual address requesting for translation;
  in response to receiving the address translation request, looking up a translation entry whose virtual address tag matches the virtual address in the plurality of translation entries based on the page size represented by the size flag bit of the translation entry;
  translating the virtual address into a physical address based on the matching translation entry;
  filling backfill content into a to-be-backfilled entry of the translation lookaside buffer, when a lower-level cache returns the backfill content; and
  setting a size flag bit of the to-be-backfilled entry based on a page size of the backfill content.

14. The address translation method according to claim 13, wherein the translation lookaside buffer uses a fully associative structure, and wherein looking up the translation entry whose virtual address tag matches the virtual address in the plurality of translation entries based on the page size represented by the size flag bit of the translation entry comprises:

traversing the plurality of translation entries;

for a traversed translation entry, truncating a virtual address tag from the virtual address based on a page size represented by a size flag bit of the traversed translation entry; and     comparing the truncated virtual address tag with a virtual address tag of the traversed translation entry, wherein if the two virtual address tags are equal, matching succeeds.

15. The address translation method according to claim 13, wherein the translation lookaside buffer uses a set associative structure, and wherein looking up the translation entry whose virtual address tag matches the virtual address in the plurality of translation entries based on the page size represented by the size flag bit of the translation entry comprises:

traversing a preset page size set;

for a traversed page size of the preset page size set, truncating a virtual address tag and a virtual address index from the virtual address based on the traversed page size;

locating a to-be-matched translation entry set in the plurality of translation entries based on the truncated virtual address index; and     when the traversed page size is equal to a page size represented by a size flag bit of a translation entry in the to-be-matched translation entry set, comparing the truncated virtual address tag with a virtual address tag of the translation entry in the to-be-matched translation entry set, wherein if the two virtual address tags are equal, matching succeeds.

16. The address translation method according to claim 13, wherein translating the virtual address into the physical address based on the matching translation entry comprises:

acquiring a physical address tag from the matching translation entry;

truncating an offset address from the virtual address; and     splicing the physical address tag and the offset address to generate a translated physical address.

17. The address translation method according to claim 13, further comprising:

when address translation matching fails, initiating a backfill request to the lower-level cache by using the virtual address.

\* \* \* \* \*